United States Patent
Plianos et al.

(10) Patent No.: US 11,524,686 B2
(45) Date of Patent: Dec. 13, 2022

(54) METHOD OF CONTROLLING A PRIME MOVER OF A VEHICLE, APPARATUS FOR CONTROLLING A PRIME MOVER OF A VEHICLE, AND A VEHICLE COMPRISING SUCH AN APPARATUS

(71) Applicant: JAGUAR LAND ROVER LIMITED, Warwickshire (GB)

(72) Inventors: Alex Plianos, Coventry (GB); Kestutis Jankevicius, Coventry (GB); Nicholas McMullin, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 55 days.

(21) Appl. No.: 16/145,591

(22) Filed: Sep. 28, 2018

(65) Prior Publication Data

US 2019/0100209 A1 Apr. 4, 2019

(30) Foreign Application Priority Data

Oct. 2, 2017 (GB) .................................. 1716035

(51) Int. Cl.
*B60W 30/18* (2012.01)
*B60W 30/14* (2006.01)
(Continued)

(52) U.S. Cl.
CPC ....... *B60W 30/18072* (2013.01); *B60K 31/00* (2013.01); *B60W 30/146* (2013.01);
(Continued)

(58) Field of Classification Search
CPC ......... B60W 30/18072; B60W 30/146; B60W 30/16; B60W 30/18127; B60W 50/14; F02D 41/042; F02D 41/0005; B60K 31/00
See application file for complete search history.

(56) References Cited

U.S. PATENT DOCUMENTS 6,549,841 B1 * 4/2003 AxElsson .......... B60K 31/0058
701/79
6,626,257 B2 * 9/2003 Kurz ..................... B60K 28/16
180/169
(Continued)

FOREIGN PATENT DOCUMENTS

DE  102008023135 A1  11/2009
DE  10 2012 025 036 A1   6/2014
EP      3 225 488 A1  10/2017

OTHER PUBLICATIONS

Search Report for DE Application No. 10 2018 216 003.1 dated Sep. 9, 2019.
(Continued)

*Primary Examiner* — Thomas Ingram
(74) *Attorney, Agent, or Firm* — Carlson, Gaskey & Olds, P.C.

(57) ABSTRACT

Controlling a prime mover of a first vehicle following a first path is based, at least in part, on a likely speed behaviour of a second vehicle ahead of the first vehicle, which is estimated based on a predicted path of the second vehicle. At least one coasting profile for the first vehicle is estimated for at least part of the first path and/or the predicted path. At least one of the coasting profiles is determined that meets at least one predetermined coasting requirement. The prime mover may be controlled to place the vehicle into a coasting mode based on the determined coasting profile. Alternatively, feedback is provided to a user to put the vehicle into a coasting mode.

19 Claims, 9 Drawing Sheets

(51) Int. Cl.
*B60K 31/00* (2006.01)
*B60W 50/14* (2020.01)
*B60W 30/16* (2020.01)
*F02D 41/00* (2006.01)
*F02D 41/04* (2006.01)

(52) U.S. Cl.
CPC ...... *B60W 30/16* (2013.01); *B60W 30/18127* (2013.01); *B60W 50/14* (2013.01); *F02D 41/0005* (2013.01); *F02D 41/042* (2013.01); *B60K 2031/0091* (2013.01); *B60W 2030/1809* (2013.01); *F02D 41/0007* (2013.01); *F02D 41/0077* (2013.01); *F02D 2041/001* (2013.01); *F02D 2200/701* (2013.01)

(56) References Cited

U.S. PATENT DOCUMENTS

| | | | | |
|---|---|---|---|---|
| 8,433,494 B2* | 4/2013 | Vogel | ........... | B60W 10/06 701/93 |
| 8,494,737 B2* | 7/2013 | Maier | ........... | B60W 50/0097 701/65 |
| 8,712,674 B2* | 4/2014 | Maruyama | ........... | B60W 30/16 701/116 |
| 9,327,730 B2* | 5/2016 | Miller | ........... | B60T 7/12 |
| 9,540,004 B2* | 1/2017 | Kim | ........... | B60W 30/18072 |
| 9,783,200 B2* | 10/2017 | Park | ........... | B60W 30/18072 |
| 2006/0138975 A1* | 6/2006 | Lim | ........... | B25J 9/162 318/66 |
| 2010/0179726 A1 | 7/2010 | Leinung | | |
| 2015/0019117 A1 | 1/2015 | Huber et al. | | |
| 2015/0298699 A1 | 10/2015 | Poechmueller et al. | | |
| 2016/0121898 A1 | 5/2016 | Jo et al. | | |
| 2016/0297435 A1 | 10/2016 | D'Amato et al. | | |
| 2016/0325728 A1* | 11/2016 | Yang | ........... | B60L 15/2045 |
| 2017/0259819 A1* | 9/2017 | Takeda | ........... | B60W 10/04 |

OTHER PUBLICATIONS

Combined Search and Examination Report under Sections 17 and 18(3) for Application No. GB1716040.9 dated Mar. 29, 2018.
Combined Search and Examination Report under Sections 17 and 18(3) for Application No. GB1716038.3 dated Mar. 27, 2018.
Combined Search and Examination Report under Sections 17 and 18(3) for Application No. GB1716035.9 dated Mar. 21, 2018.
Search Report for DE Application No. 10 2018 215 976.9 dated Jul. 31, 2019.

* cited by examiner

METHOD OF CONTROLLING A PRIME MOVER OF A VEHICLE, APPARATUS FOR CONTROLLING A PRIME MOVER OF A VEHICLE, AND A VEHICLE COMPRISING SUCH AN APPARATUS

CROSS REFERENCE TO RELATED APPLICATION

This application claims priority to United Kingdom Patent Application No. GB 1716035.9, filed on 2 Oct. 2017.

TECHNICAL FIELD

The present disclosure relates to the control of a prime mover of a vehicle.

Aspects of the invention relate to a method of controlling a prime mover of a vehicle, apparatus for controlling a prime mover of a vehicle, and a vehicle comprising such an apparatus.

BACKGROUND

Various driver assistance aids are used in modern vehicles. For example, cruise control may be used to maintain a constant speed within a narrow speed range without driver input. Cruise control is useful, but in its simplest form has the disadvantage of being inflexible. Constant speed cruise control does not take into account slower vehicles in front of the vehicle for which the speed is being controlled. Accordingly, a driver using cruise control must still be aware of the relative speeds of other vehicles and take appropriate action to adjust the vehicle speed as the speed of other road users in the vicinity of the vehicle varies.

Adaptive cruise control seeks to address at least some of the disadvantages of constant speed cruise control, by adapting the controlled speed to the circumstances. For example, if a vehicle in the same lane is moving more slowly than the vehicle with the adaptive cruise control, the cruise control may control the prime mover of the vehicle, such as an engine or electric traction motor and/or brakes in order to match the speed of the slower car. Such cruise control systems may use, for example, radar to detect the position of vehicles ahead.

Driver assist programs may also be used to help a driver control speed automatically or semi-automatically.

Speed control is also an important aspect of autonomous and semi-autonomous vehicle control systems.

There is pressure on car manufacturers to improve vehicle efficiency. There are many ways in which efficiency may be improved, ranging from reducing vehicle weight to educating drivers. Cruise control systems do not, in general, seek to improve vehicle efficiency.

It is an aim of the present invention to address disadvantages of the prior art.

SUMMARY OF THE INVENTION

Aspects and embodiments of the invention provide a method of controlling a prime mover of a vehicle, apparatus for controlling a prime mover of a vehicle, and a vehicle comprising such an apparatus as claimed in the appended claims According to an aspect of the invention, there is provided a method of controlling a prime mover of a first vehicle following a first path, comprising:

estimating a likely speed behaviour of a second vehicle ahead of the first vehicle based on a predicted path of the second vehicle;

estimating at least one coasting profile for the first vehicle over at least part of the first path and/or the predicted path;

determining at least one of the coasting profiles that meets at least one predetermined coasting requirement; and outputting a coasting signal for either:

controlling the prime mover to place the first vehicle into a coasting mode based on the at least one determined coasting profile; or providing feedback to a vehicle user to place the first vehicle into a coasting mode, such that the vehicle if placed in the coasting mode by the user will coast in accordance with the at least one determined coasting profile.

The at least one predetermined coasting requirement may comprise maintaining a minimum distance between the first and second vehicles.

The at least one predetermined coasting requirement may comprise the first vehicle's speed being within a predetermined tolerance of the second vehicle's speed.

The at least one predetermined coasting requirement may comprise the first vehicle's speed being within a predetermined tolerance of the second vehicle's speed while maintaining a minimum and/or maximum distance between the first and second vehicles.

The at least one predetermined coasting requirement may comprise one or more of:

a minimum coasting mode duration;

a minimum coasting mode distance;

a minimum coasting mode speed;

a maximum coasting mode speed;

maintaining the first vehicle's speed with a predetermined tolerance of one or more desired speeds.

Controlling the prime mover may comprise one or more of:

placing a transmission associated with the prime mover into neutral;

disengaging a clutch associated with the prime mover;

turning off the prime mover; and modulating one or more engine system actuators, such as an exhaust gas recirculation valve, variable geometry turbocharger, intake throttle, and continuous variable valve timing, so as to reduce or minimise pumping losses. One or more of the engine system actuators may be engine air system actuators.

The first vehicle may include a regenerative prime mover, and the coasting mode may include regenerative braking. The prime mover of a vehicle could be an internal combustion engine and where the vehicle is a hybrid vehicle, the vehicle may have two prime movers including one internal combustion engine. Turning off the prime mover may mean stopping the internal combustion engine or any other prime mover in the vehicle.

According to another aspect of the invention, there is provided a vehicle speed control system for controlling a prime mover of a first vehicle following a first path, the system comprising:

means for estimating a likely speed behaviour of a second vehicle ahead of the first vehicle based on a predicted path of the second vehicle;

means for estimating at least one coasting profile for the first vehicle over at least part of the first path and/or the predicted path;

means for determining at least one of the coasting profiles that meets at least one predetermined coasting requirement;

and means for controlling the prime mover to place the vehicle into a coasting mode based on the at least one determined coasting profile.

The means for estimating a likely speed behaviour of the second vehicle, may comprise:

an electronic processor having an electrical input for receiving signals indicative of a value of vehicle speed, distance to the second vehicle ahead of the first vehicle, current location of the first vehicle and map data, and;

an electronic memory device electrically coupled to the electronic processor and having instructions stored therein, wherein the electronic processor is configured to access the electronic memory device and execute the instructions stored therein such that it is operable, in dependence on said signals indicative of a value of vehicle speed, distance to the second vehicle ahead of the first vehicle, current location of the first vehicle and map data, to determine at least one coasting profile to meet at least one predetermined coasting requirement.

The means to identify at least one of the coasting profiles and the means to output a coasting signal may comprise the electronic processor identifying one of said estimate of a likely speed behaviour of the second vehicle based on a predicted path of the second vehicle and generating said coasting signal in response thereto.

The at least one predetermined coasting requirement may comprise maintaining a minimum distance between the first and second vehicles.

The at least one predetermined coasting requirement may comprise the first vehicle's speed being within a predetermined tolerance of the second vehicle's speed.

The at least one predetermined coasting requirement may comprise the first vehicle's speed being within a predetermined tolerance of the second vehicle's speed while maintaining a minimum and/or maximum distance between the first and second vehicles.

The at least one predetermined coasting requirement may comprise one or more of:
  a minimum coasting mode duration;
  a minimum coasting mode distance;
  a minimum coasting mode speed;
  a maximum coasting mode speed;
  maintaining the first vehicle's speed with a predetermined tolerance of one or more desired speeds.

Controlling the prime mover may comprise one or more of:
  placing a transmission associated with the prime mover into neutral;
  disengaging a clutch associated with the prime mover;
  turning off the prime mover; and
  modulating one or more engine system actuators, such as an exhaust gas recirculation valve, variable geometry turbocharger, intake throttle, and continuous variable valve timing, so as to reduce or minimise pumping losses. One or more of the engine system actuators may be engine air system actuators.

The first vehicle may include a regenerative prime mover, and the coasting mode may include regenerative braking.

According to another aspect of the invention, there is provided an adaptive cruise control or driver assistance throttle control method implemented in a first vehicle, the method comprising:
  determining that the first vehicle will come within a threshold distance of a second vehicle ahead of the first vehicle;
  estimating at least one coasting profile for the car, the coasting profile representing an estimated change of speed while the vehicle is coasting;
  selecting one of the estimated coasting profiles that will assist in reducing the likelihood of the first vehicle coming within the threshold distance; and
  either:
    causing the vehicle to enter a coasting mode corresponding to the selected coasting profile; or
    providing feedback to an user of the first vehicle to place the vehicle into a coasting mode corresponding to the selected coasting profile.

The adaptive cruise control or driver assistance throttle control method may comprise determining at least one coasting profile that will prevent the first vehicle coming within the threshold distance.

The selected coasting profile may be selected on the basis that the first vehicle's speed will change during the coasting mode so as to be closer to the second vehicle's speed at the end of the coasting profile than it was at the start of the coasting profile.

According to another aspect of the invention, there is provided an adaptive cruise control or driver assistance throttle control controller, comprising:
  means for determining that the first vehicle will come within a threshold distance of a second vehicle ahead of the first vehicle;
  means for estimating at least one coasting profile for the car, the coasting profile representing an estimated change of speed while the vehicle is coasting;
  means for selecting one of the estimated coasting profiles that will assist in reducing the likelihood of the first vehicle coming within the threshold distance; and
  means for either:
    causing the vehicle to enter a coasting mode corresponding to the selected coasting profile; or
    providing feedback to a user of the first vehicle to place the vehicle into a coasting mode corresponding to the selected coasting profile.

According to another aspect of the invention, there is provided a non-transitory computer readable carrier medium carrying computer readable code for controlling a vehicle to carry out any aspect of the invention.

According to another aspect of the invention, there is provided a non-transitory computer readable medium carrying computer readable code which when executed causes a vehicle to carry out any aspect of the invention.

According to another aspect of the invention, there is provided a computer program product executable on a processor so as to implement any aspect of the invention.

According to another aspect of the invention, there is provided a processor arranged to implement any aspect of the invention.

According to another aspect of the invention, there is provided a vehicle comprising the vehicle coasting system, the non-transitory computer readable carrier medium, the computer program product, or the processor, set out in any of the previous aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
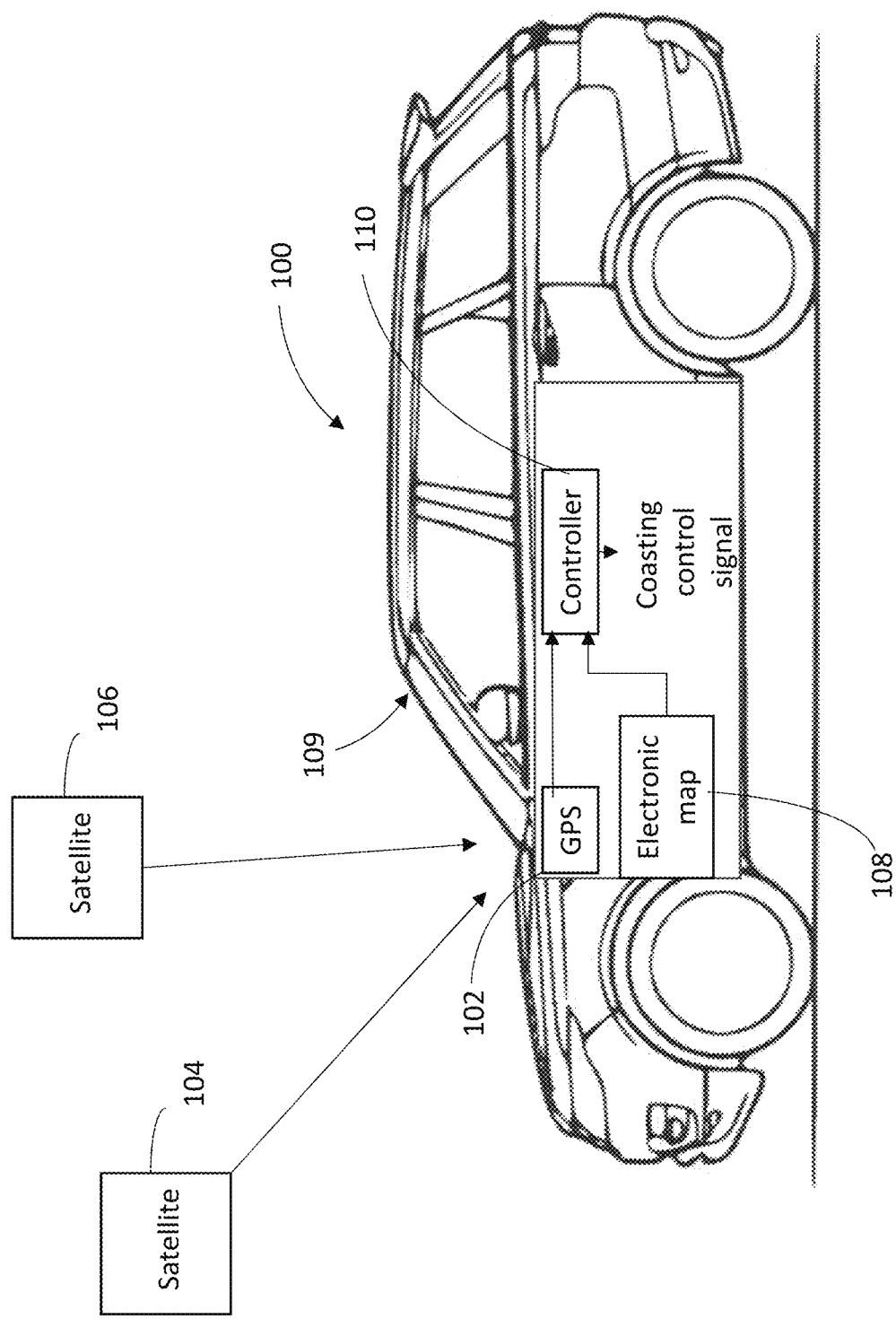
FIG. 1 shows a vehicle in the form of a car comprising apparatus for controlling a prime mover of a first vehicle following a first path, according to an embodiment of the invention.

Referring to FIG. 1, a vehicle in the form of a first car 100 is equipped with technology that enables it to estimate the likely speed behaviour of a second vehicle ahead of it. Reference is made to a car by way of example only, as it will be appreciated that the various aspects and embodiments of the present invention lend themselves equally to cars, SUVs, MPVs, vans, trucks and any other vehicle that may be used on the road. The first car 100 is following a first path, which may be known, estimated or determined in any suitable way. For example, the car may include a GPS unit 102 that receives signals from GPS satellites 104 and 106 in a known manner (typically signals from at least three satellites will be received to enable triangulation), and uses the relative time delays of the received signals to triangulate a location of the first car 100. The car may include a camera, radar or other proximity sensing means 109 that senses objects and terrain in the proximity of the first car 100 and the controller may use this information to judge the location of the first car 100 and the distance of any objects from the first car 100. The first car 100 may also have an electronic map unit 108 that stores map information. In the present case, the map information may include, for example, road topography, locations such as cities, towns and suburbs, and points of interest. Geometric data may also be stored by the electronic map unit. The geometric data includes terrain data, and in particular information about changes in elevation and will take into account headings and speed limits. The terrain data may be stored locally or accessed remotely via a wireless network, and may be sourced from the GPS unit 102 or may form part of the map information.

A controller 110 accepts information regarding the current location of the first car 100 from the GPS unit 102 and/or the proximity sensing means and information from the electronic map unit. The controller 110 may use this information to estimate or determine a path that the car will follow (or most likely follow). The path may be based on several possibilities. For example, the user of the vehicle, such as the driver may input a destination and other route information into a satellite navigation ("satnav") interface. From this, the vehicle can determine with reasonable certainty the likely path that the car will follow. Where a route is determined in advance, such as when satnav is in use, it may be followed by the car automatically (e.g., in a fully autonomous car), semi-automatically (e.g., using a driver assist function) or by way of voice navigation commands to a human driver.

If the driver is not using the satnav function, a probable path may be calculated based on electronic map information. For example, a driver on a highway, motorway or main road is relatively likely to remain on that road, possibly for some distance, and therefore the most likely path is relatively easy to predict.

The electronic map information may optionally be combined with information from vehicle sensors that describe vehicle state. For example, a driver using an indicator while slowing down at a particular point on the road suggests that the driver is about to turn in the direction indicated by the indicator selection.

In other embodiments, vehicle to vehicle (V2V) and/or vehicle to infrastructure (V2I) communications may be used to estimate or determine the likely vehicle path. For example, if a V2I communication is received indicating that the road ahead is closed, the car can determine the likely path the driver will take to avoid the closed road.

In yet other embodiments, previous user behaviour may be used as an input to path estimation. For example, if the user regularly commutes to and from work around certain times, the car may assume that the destination is home or work when the user is using the car during those times, and that the most likely path is that which the user takes every day.

While illustrated as being within the first car 100, it will be appreciated that the controller 110 and/or map unit 108 may be remotely located on one or more servers or other computer(s) accessible by the first car 100. The GPS unit 102 will usually be local to the first car 100, but in other embodiments the information regarding the current location of the first car 100 may be provided in other ways. For example, other forms of location determination may be used, such as different satellite positioning systems (e.g., the European Galileo positioning system), time delay triangulation using telecommunication base stations signals, inertial-based measurement systems, or any combination thereof.

Figure 2:
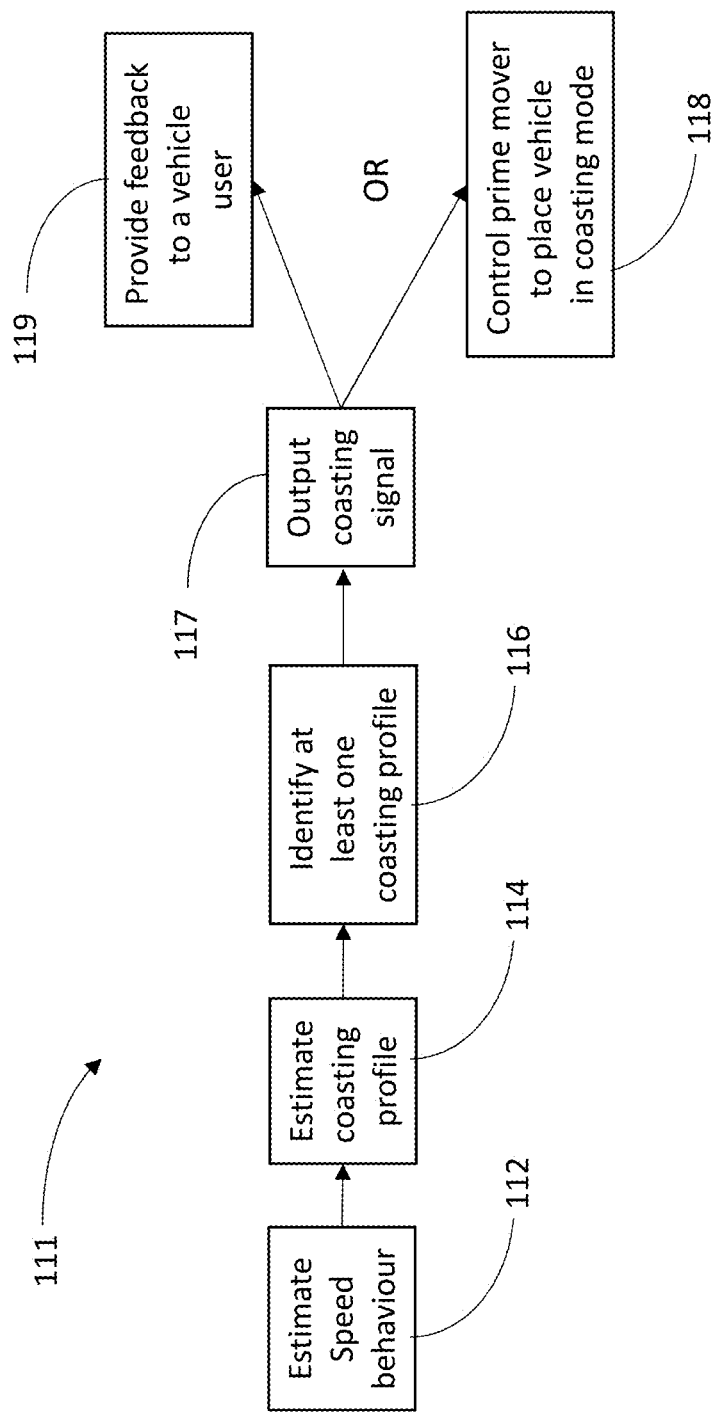
FIG. 2 is a flowchart showing a method of controlling a prime mover of a first vehicle following a first path, according to an embodiment of the invention.
Figure 3:
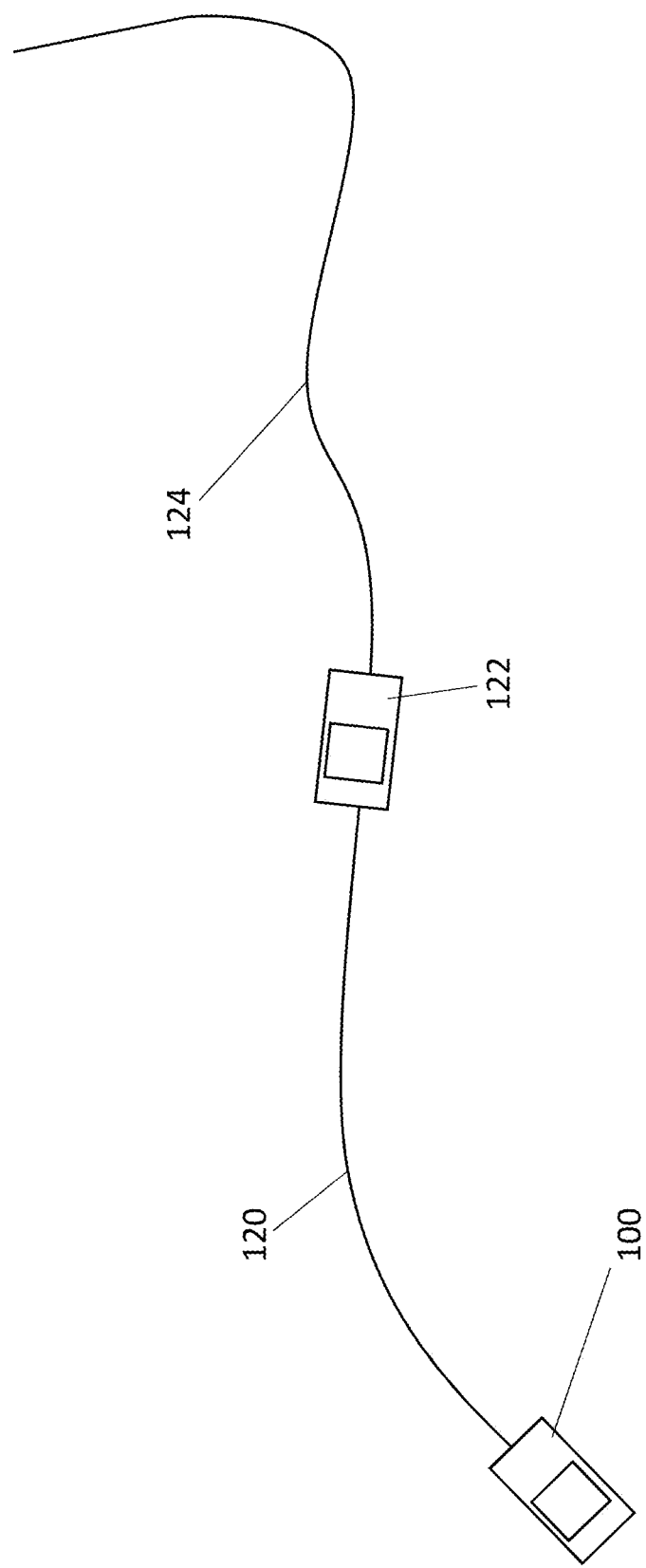
FIG. 3 is schematic plan view of first and second vehicles, the first vehicle comprising an apparatus for controlling a prime mover, according to an embodiment of the invention.

Turning to FIGS. 2 and 3, there is shown a method 111 of controlling a prime mover of a first vehicle, such as the first car 100. As best shown in FIG. 3, the first car 100 is following a first path 120, such as the car path estimated or determined as described above. A likely speed behaviour of a second vehicle, such as a second car 122, ahead of the first car 100 is estimated 112 based on a predicted path 124 of the second car 122. This second car is detected and located relative to the first car 100 by, for example, any one of; received V2V data V2I data or proximity sensing means 109.

The predicted path 124 may be predicted in any suitable manner. For example, if the second car 122 is able to communicate with the first car 100 by way of wireless communication, such as via a V2V communications protocol, then the first car 100 may receive the predicted path 124 from the car 122. In that case, the car 122 may predict or determine the predicted path 124 in any suitable manner. This may include, for example, the second car 122 being equipped with similar technology as described in relation to the first car 100 in relation to FIG. 1.

Additionally, or in other embodiments, the first car may predict the predicted path 124 itself, without receiving direct communication from the second car 122. For example, the first car 100 may use radar, lidar, video analysis, or any other suitable technical method, to determine the relative position of the second car 122 relative to the first car 100. From that information, the first car 100 may determine a location of the second car 122, and from that, determine a predicted path 124 of the second car 122.

Optionally, the first car 100 may use geographical information, such as the information from the electronic map unit 108, to determine the location of the second car, and from that, determine the predicted path of the second car 122.

In other embodiments, the first car 100 may simply assume that the second car 122 will indefinitely continue at its current speed and on the current road, and will predict the likely path of the second car 122 on that basis.

However the predicted path 124 is estimated, the first car 100 estimates 112 a likely speed behaviour of the second car 122 based on the predicted path 124.

The likely speed behaviour of the second car 122 may be estimated in any suitable manner. For example, the first car 100 may note that the predicted path is a motorway, freeway, or main road, and from that information infer that the speed behaviour of the second car 122 will involve constant speed. The first car 100 also use its knowledge of the road ahead (based on, for example, the information from the electronic map unit) to estimate the likely speed behaviour. For example, if the predicted path includes a sharp curve that will require the second car 122 to slow from its current speed, the likely speed behaviour will involve slowing down for the curve, and speeding up as the road straightens again. Similarly, if the predicted path includes a change in posted or legal speed limit, the likely speed behaviour will involve the second car 122 speeding up or slowing down from its current speed to meet the new speed limit.

The first car 100 may then estimate 114 at least one coasting profile over at least part of the first path and/or the predicted path. As will be described in more detail below, each coasting profile represents a predicted speed profile of the first car 100 over a time and/or distance from that coasting profile's starting point, while the car is coasting. Each coasting profile may be generated based on a geometry of at least a portion of the predicted vehicle path.

Next, a coasting profile that meets at least one predetermined coasting requirement is determined 116. There are several potential predetermined coasting requirements that may be met, either alone or in combination. For example, one predetermined coasting requirement is that a minimum distance is maintained between the first car 100 and the second car 122. Such a minimum distance may be a fixed distance, or, more likely, will be a variable distance based on factors such as the current and/or estimated future speeds of the first car 100 and the second car 122, a braking ability of the first vehicle 100, road conditions (including whether the road is wet or formed from a relatively slippery surface such as gravel), and any posted or legal speed limits that are in force.

Another potential predetermined coasting requirement is that the first car's speed is maintained within a predetermined tolerance of one or more desired speeds, such as the first car's current speed, the second car's current speed, any speed associated with the predicted speed behaviour, or any maximum or minimum posted or legal speed limits in force.

Yet other potential predetermined coasting requirements comprise:
a minimum coasting duration;
a minimum coasting distance;
a minimum coasting speed; and
a maximum coasting speed.

The at least one predetermined coasting requirement may comprise a combination of these features, such as requiring that the first car's speed be within a predetermined tolerance of the second vehicle's speed while maintaining a minimum and/or maximum distance between the first and second vehicles.

As described below, the speed range when in a coasting mode may be wider than when in a non-coasting mode. For example, the speed range when in a non-coasting mode may comprise a hard limit above and below a nominal cruise control speed. The speed range when in a coasting mode may comprise a different hard limit above and below a nominal coasting profile. The hard limit in the coasting mode may comprise the hard limit from the non-coasting mode plus a soft limit added to increase the speed range during coasting.

Once a coasting profile has been determined, a coasting signal is output 117. Responsive to the coasting signal, the prime mover is controlled 118 to place the first car 100 into a coasting mode based on the determined coasting profile. Alternatively, feedback may be provided 119 to a vehicle user, such as the driver, as described in more detail below.

Controlling the prime mover to place the first car 100 into a coasting mode may comprise any one or more of:
placing a transmission associated with the prime mover into neutral;
disengaging a clutch associated with the prime mover;
turning off the prime mover; and
modulating one or more engine air system actuators, such as an exhaust gas recirculation valve, variable geometry turbocharger, intake throttle, and continuous variable valve timing, so as to reduce or minimise pumping losses.

Alternatively, or in addition, the first car 100 may include a regenerative prime mover, and the coasting mode may include regenerative braking.

If the current vehicle speed does not presently match that of the initial speed of the selected coasting profile, then prior to placing the prime mover into the coasting mode, a speed of the vehicle is adjusted to match the initial speed of the identified coasting profile.

The prime mover of the car may be any one or more drive sources. In a conventional vehicle, the prime mover may be one or more internal combustion engines such as a two-stroke or four-stroke diesel or petrol engine, or a turbine. In that case, entering a coasting mode may comprise one or more of:
placing a transmission associated with the internal combustion engine into neutral;
disengaging a clutch associated with the internal combustion engine;
engine braking;

turning off the internal combustion engine;

modulating one or more engine air system actuators, such as an exhaust gas recirculation valve, variable geometry turbocharger, intake throttle, and continuous variable valve timing, so as to reduce or minimise pumping losses.

An advantage of placing the transmission into neutral and/or disengaging the clutch is that the internal combustion engine is no longer turned via its connection to car's drive wheels. Even when an internal combustion engine is turned off, deprived of fuel and/or used for engine braking, there may be significant frictional and pumping losses as a result of the rotation of the crank and reciprocation of pistons, for example.

An advantage of modulating one or more engine system actuators as described above is that air pumping losses may be reduced sufficiently that the engine may not need to be turned off or the clutch disengaged in order to obtain some improvements in fuel efficiency while coasting. One or more of the engine system actuators may be engine air system actuators.

Alternatively, or in addition, the prime mover may include one or more electrical motors, such as a DC or AC motor. In that case, entering a coasting mode may comprise one or more of:

providing no drive via the one or more electrical motors;

providing regenerative braking via the one or more electrical motors; and providing reduced drive via the one of more electrical motors.

It will be understood that where coasting involves regenerative braking or reduced drive (electrical motors), and/or turning off the engine or engine braking (internal combustion engine), these mechanisms may be deployed in such a way that the deceleration they cause is less than that which would result from any known uses of such mechanisms. For example, regenerative braking is generally employed in a way that maximises the amount of energy that may be recovered, within the context of a maximum braking profile for vehicle user comfort. In the present case, the amount of regenerative braking (and/or the reduced drive) may be selected such that the amount of regenerated energy during any regenerative phase is less than the maximum possible had coasting not been employed. When considered over the entire coasting event, however, the net energy position is improved—i.e., coasting results in less energy being used in total, compared with allowing maximal regenerative braking under the maximum braking profile without coasting.

Other states that may be involved when coasting include:

A. Engine over-run (also known as engine braking, deceleration fuel shut off, engine connected coasting) is a state in which the internal combustion (IC) engine remains connected to a driveline of the vehicle via a transmission. The vehicle is allowed to roll, without application of the accelerator pedal. In this condition fuel may be cut-off (so called deceleration fuel shut-off) and the vehicle slowly decelerates due to engine braking ('engine over-run') and other external factors. Such coasting may be referred to as 'engine-connected coasting' and includes the (zero throttle) condition in which the vehicle can maintain speed without assistance from the IC engine or electric machine, such as travelling downhill, as well as the (zero throttle) level-driving condition in which speed is deliberately permitted to fall without braking of the vehicle wheels by means of the braking system. During engine-connected coasting, IC engine speed is a function of the speed of the vehicle and the gear ratio of the transmission, so is typically higher than idle speed. In an IC engine, relatively high friction and pumping losses cannot be avoided, notwithstanding that fuel is cut-off. Eventually, engine-connected coasting may cause the engine speed to fall to a level at which fuel must be readmitted (the fuel cut-in speed) to avoid stalling of the engine upon fuelling. The engine fuel cut-in speed is generally close to normal engine idle speed.

B. Engine stop sail (also known as sailing, freewheeling, high speed free-rolling) is a state in which the drivetrain is opened (the internal combustion engine and the transmission are decoupled) and the IC engine is shut-down. No fuel is used and losses are minimised. As long as there is an efficient method to restart the engine, this is usually the most efficient of coasting states.

C. Neutral coasting (also known as idle coasting, engine-on sail) is a state in which the vehicle transmission is shifted into neutral, so that engine speed can drop to idle. In an IC engine, fuel must be admitted to the engine to keep it running at idle speed, so that from a fuel economy viewpoint, the advantage of deceleration fuel shut-off is lost, but lower friction windage and pumping losses may apply.

D. Simulated coasting (hybrid only) is a state in which the engine and/or a belt-integrated starter generator ("BiSG"), or crankshaft-integrated motor generator (CiMG), are caused to deliver positive torque to the transmission in an amount sufficient to overcome internal losses associated with the engine, transmission and driveline. The transmission remains connected to the driveline. The amount of positive torque delivered in order to overcome internal losses may be determined in dependence on vehicle speed according to a look-up table. A sub-category of simulated coasting is when an engine produces positive power to charge the high voltage battery through a generator motor E. High-speed stop on the move is a state in which the engine is stopped and speed remains relatively constant due to local conditions. Using knowledge of local gradient (e.g. using e-horizon data) the vehicle maintains a current speed.

F. Low-speed stop on the move is a state employed during short stops, in which the vehicle stops the engine in order to save fuel and then re-starts when it needs to move off. This is known as 'stop-start' and is may be used on both automatic and manual transmission vehicles. Low-speed stop on the move extends the engine shut-down event to the time before the vehicle comes to a complete stop. This stop event relies on certain pre-set conditions such as vehicle speed and brake actuation i.e. the vehicle must be below a certain speed and the driver must have the brake pressed for the engine to cut.

One way of characterising "coasting" as used here is the use of a vehicle's momentum. In at least some embodiments, "coasting" may in particular involve reducing fuel or energy use.

It may be desirable, either universally or in certain situations, to only select coasting profiles for which the coasting mode event exceeds a threshold. This may be for reasons of efficiency, for example because it takes a certain amount of energy to restart an internal combustion engine if it is turned off. Alternatively, or in addition, car user comfort may inform the choice of threshold, for example because car users do not like it when a vehicle's engine is repeatedly stopped and re-started over short periods of time. A threshold of, for example, 100 metres or yards may be selected as a minimum distance for the coasting mode. In that case, a coasting profile is only implemented if the corresponding coasting mode will be effective for more than 100 metres or yards.

The example above expresses the coasting event within each coasting profile as a distance. It will be appreciated that the coasting event may also be expressed as a time instead of, or as well as, distance. The time may be determined based on the distance and speed over each coasting profile. A threshold time for the coasting mode associated with each coasting profile may be set as a minimum time (e.g., 10 seconds). In that case, a coasting profile is only implemented if the corresponding coasting mode will be effective for more than 10 seconds.

Specific examples of implementations of the invention will now be described with reference to FIGS. 4 to 8.

Figure 4:
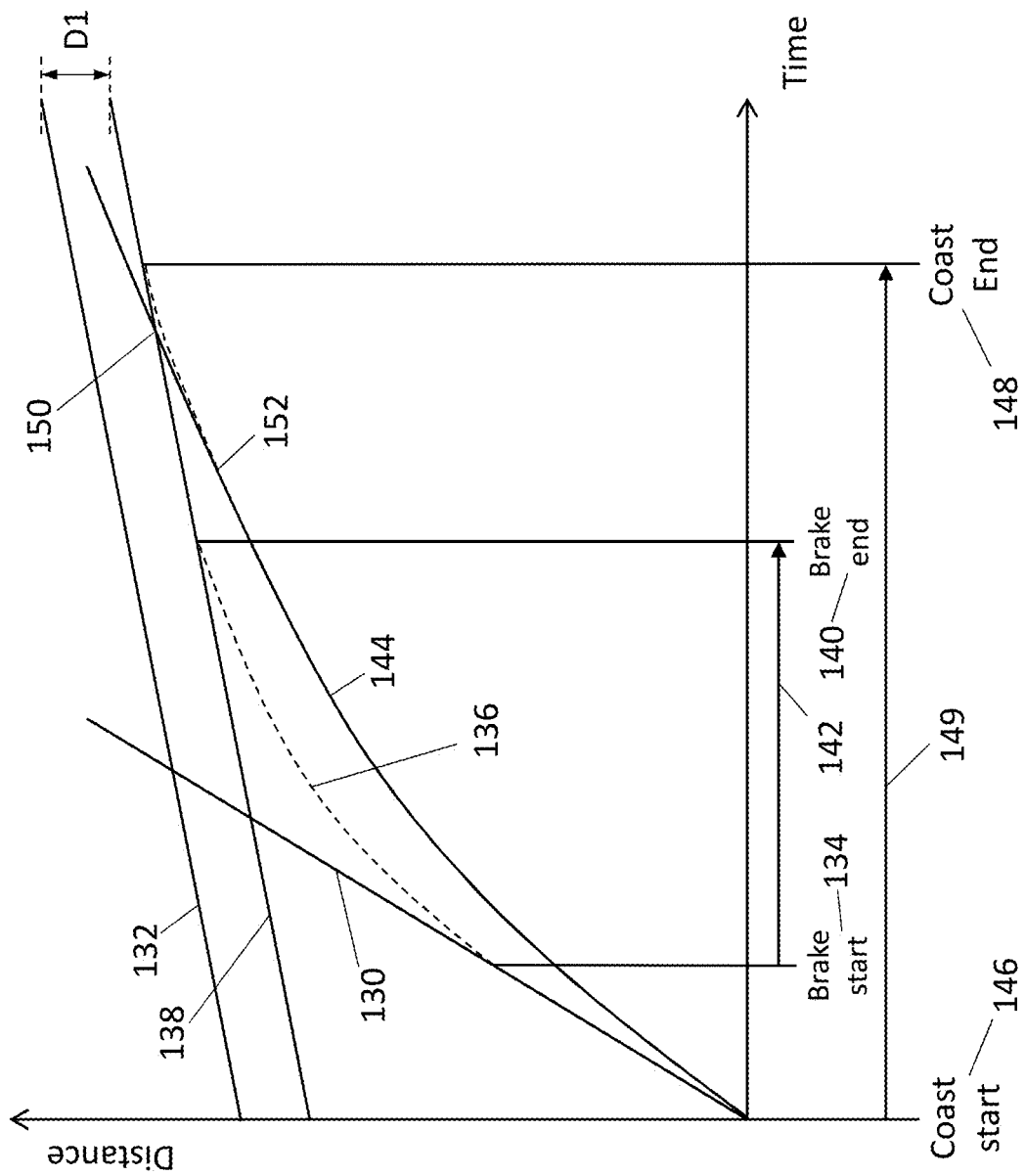
FIG. 4 is a graph showing distance relative to time for a method according to an embodiment of the invention.

Turning to FIG. 4, there is shown a graph of distance versus time. Line 130 represents the distance that would be travelled by a conventional first vehicle over time if it did not encounter a slower second vehicle. Line 132 represents the distance travelled by a second vehicle. It is apparent from the graph that the second vehicle is initially in front of the first vehicle. The angle of each of lines 130 and 132 represents the respective speeds of the vehicles to which they relate. From this, it is apparent that the first vehicle (line 130) is initially travelling considerably faster than the second vehicle (line 132).

To avoid a collision in this situation or to slow the car down faster than coasting, the brakes of the first vehicle may be applied, or the vehicle commands; engine braking (overrun), battery regeneration braking, or any combination at the brake start point 134 (collectively in this embodiment, the methods of decelerating faster than coasting are herein described as braking). Depending upon whether the first vehicle is in a cruise control or assisted driving mode, the brakes may be applied automatically by the first vehicle itself, or may be manually applied by a driver. Where cruise control or assisted driving mode is engaged, a deceleration profile 136 is implemented, under which the first vehicle is carefully slowed under braking until comes within a predetermined distance of the second vehicle. The predetermined distance is indicated by the vertical distance D1 between line 132 and parallel line 138. The brakes may then be released, which in the graph of FIG. 4 takes place at brake end 140. A total braking time 142 is indicated underneath the x-axis of the graph.

In accordance with an embodiment of the invention, the first vehicle may be placed into a coasting mode in order to, for example, reduce fuel consumption. FIG. 4 shows a coasting profile 144 that has been estimated in accordance with one of the methods described above. In this case, the coasting begins at a coast start 146 and ends at coast end 148. In this embodiment, the coast start 146 coincides with the start of the graph, but this need not be the case. This example assumes a relatively flat road during the entire coasting event from coast start 146 to coast end 148. Other embodiments will describe roads in which there are changes to terrain, legal or posted speed limits and road conditions during the course of the coasting event. A total coasting event 149 is the time between the coast start 146 and coast finish 148.

Due to the road being relatively flat during the coasting event, the first vehicle decelerates over a period of time due to a combination of air resistance and friction related to the engineering components of the car. The latter includes, for example, any combination of pumping losses, regenerative braking, drivetrain friction, and any of the other factors described above. It will be noted that the deceleration is higher earlier in the coasting event, due to the greater impact of air resistance at the higher speed. As the speed drops, air resistance becomes less of a component, and the deceleration eases. It will be noted that if the initial coasting is allowed to continue, the first vehicle's position will intersect (at point 150) with line 138, which represents the minimum distance D1 that is allowable between the first and second vehicles. Accordingly, additional speed reduction is employed at point 152. The additional speed reduction may be provided by a mechanism such as friction braking, regenerative braking, engine braking, or any other suitable mechanism. In certain circumstances, the final speed reduction may require that the coasting mode be exited, for example because considerable braking is required to ensure that the minimum distance D1 is maintained.

Figure 5:
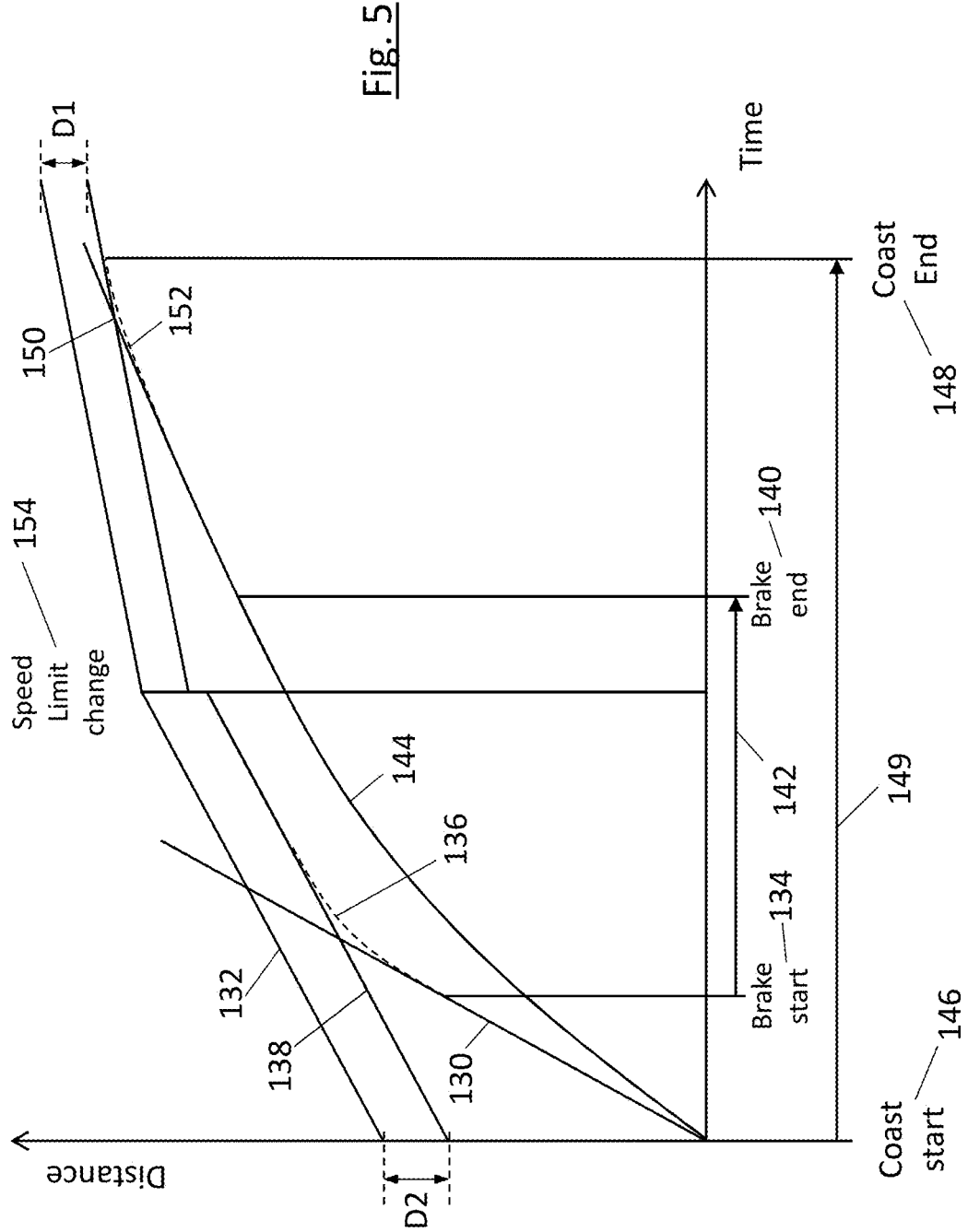
FIG. 5 is a graph showing distance relative to time for a method of controlling a prime mover of a first vehicle according to a further embodiment of the invention.

Turning to FIG. 5, in which features corresponding to those shown in FIG. 4 are indicated with like reference signs, there is shown an embodiment in which there is a change 154 in the posted or legal speed limit. Although the second vehicle is shown as decelerating instantaneously at that point, it may be desirable to model an anticipated deceleration between the first, higher speed before speed limit change 154 and the lower, slower speed after speed limit change 154. In this case, selection of a coasting profile, such as coasting profile 144, must take into account the fact that the second vehicle will likely reduce its speed to the new speed limit at speed limit change 154. It will be noted that, in this case, the distance D1 is smaller than a distance D2, because the minimum distance is lower at slower speeds. Also, in this particular example, the speed limit to which the second vehicle is limited is lower than that of the first vehicle (it will be noted that the first vehicle is travelling faster than the second vehicle until their speeds merge). This may be due to the vehicle type—for example, the first vehicle may be a car and the second vehicle may be a large truck having a slower legal speed limit than the first vehicle. If either or both of the vehicles are autonomous, they may be rated or authorised for different top speeds.

Figure 6:
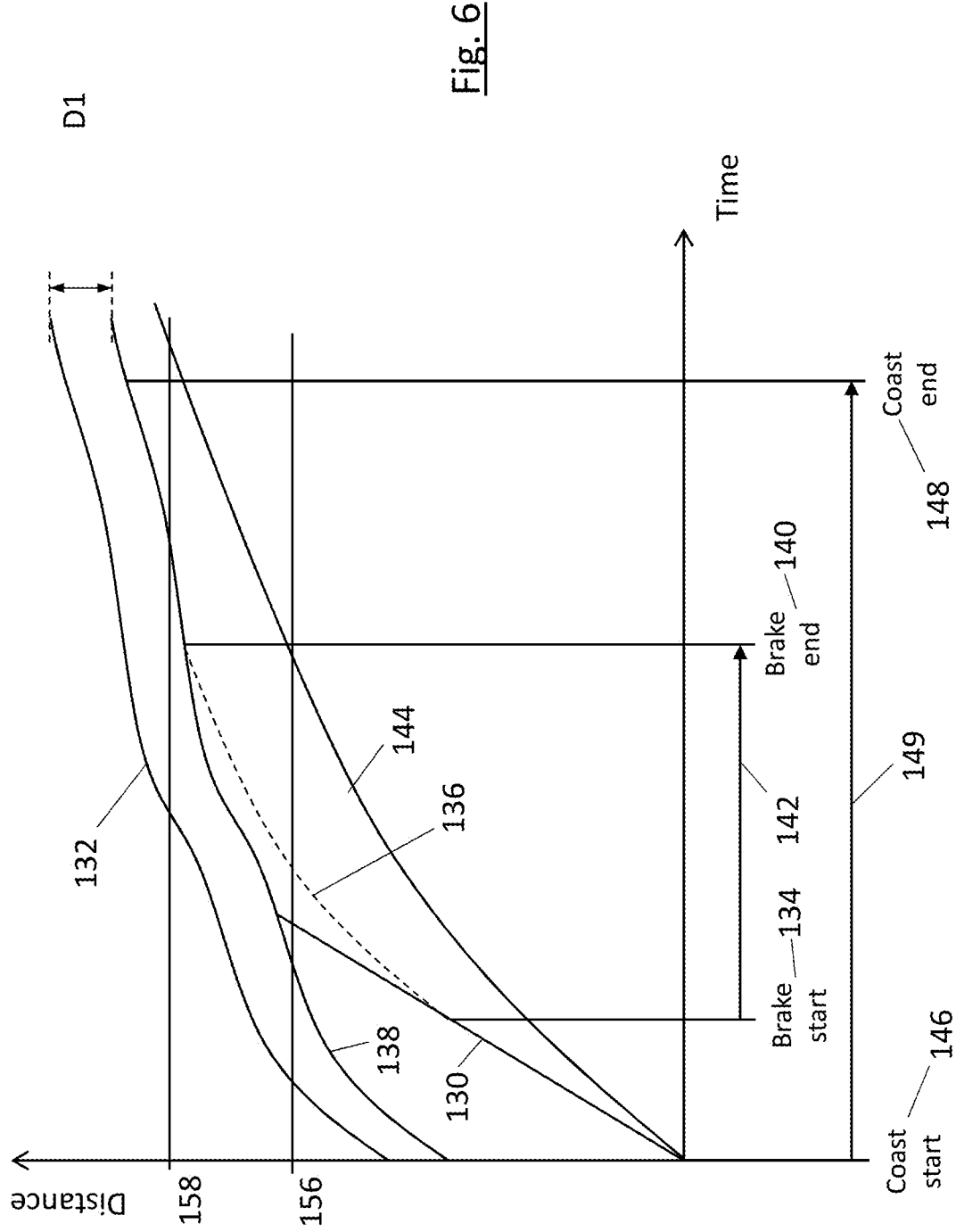
FIG. 6 is a graph showing distance relative to time for a method of controlling a prime mover of a first vehicle according to a further embodiment of the invention.

Turning to FIG. 6, in which features corresponding to those shown in FIGS. 4 and 5 are indicated with like reference signs, there is shown an embodiment in which the first and second vehicles are traversing a series of curves in the road. There is a first, relatively short, curve starting at distance 156, followed by a brief straight section of road and a longer curve starting at distance 158. It will be noted that the second vehicle is expected to decelerate for the first curve at distance 156, speed up as it leaves the first curve, and then decelerate again for the second curve at distance 158.

In this case, it is assumed that the first and second cars must both traverse the first and second curves at similar speeds to each other. It may be the case that a particular vehicle may be capable of, or authorised to, traverse corners at a faster speed than another car, which may change the coasting profile that would be chosen in certain circumstances. For example, if the first car is able to traverse corners faster than the second car, then less deceleration may be required in the coasting mode, which may allow for increased fuel efficiency.

In the embodiment of FIG. 6, the selected coasting profile ensures that the first car is moving slowly enough to safely traverse the first curve starting at distance 156. While the first car is also moving slow enough to safely traverse the second curve starting at distance 158, it will be noted that in this case there is insufficient momentum to allow the first car to approach the line 138 representing the minimum distance D1 that is to be maintained between the first and second vehicles. This may be acceptable, as there may be opportunities further along the road (whether or not modelled or determined in advance by the first car) for closing the distance between the first and second vehicles. Alternatively, it may be acceptable simply to allow greater than the minimum distance D1 between the two vehicles.

Figure 7:
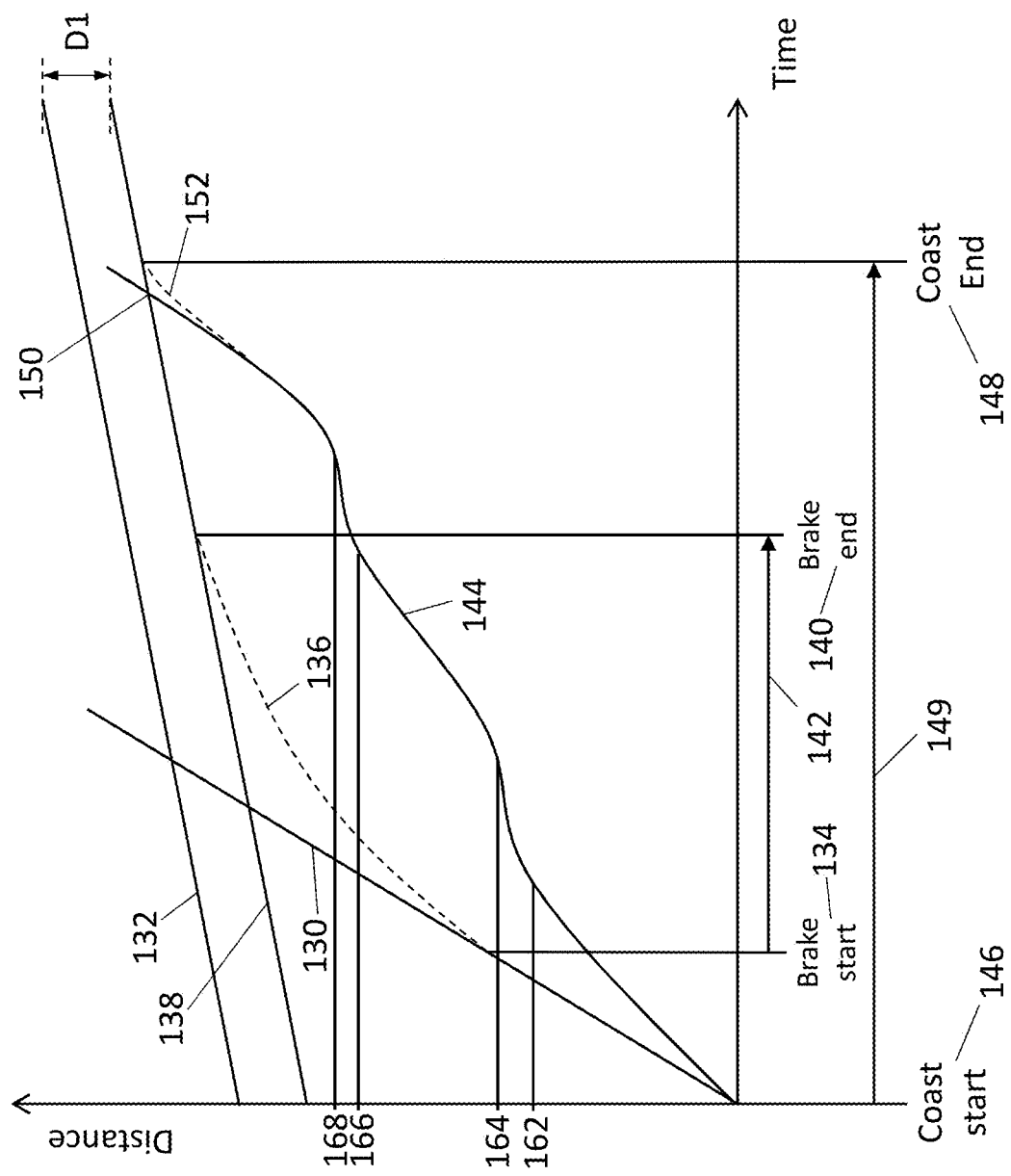
FIG. 7 is a graph showing distance relative to time for a method of controlling a prime mover of a first vehicle according to a further embodiment of the invention.

Turning to FIG. 7, in which features corresponding to those shown in FIGS. 4 to 6 are indicated with like reference signs, there is shown an embodiment in which the first and second vehicles are traversing a road that has changes in elevation. In this case, the second vehicle is in cruise control mode, and hence its speed, represented by line 132, is relatively constant. The prior art deceleration profile 136 remains similar to that shown in FIG. 4, because in prior art cruise control and throttle control systems, the vehicle's speed during deceleration events like this is tightly maintained. In contrast, as a result of entering the coasting mode at coast start 146, the first vehicle experiences a number of changes in speed as it encounters various changes in elevation. For example, a first uphill section starts at distance 162, which results in the first vehicle slowing. A first downhill section starts at distance 164, resulting in the first vehicle speeding up. A second uphill section starts at distance 166, which results in the first vehicle again slowing. Finally, a second uphill section starts at distance 168, which results in the first vehicle again speeding up. It will be noted that if the first vehicle were allowed to continue coasting, it would breach the minimum distance D1. Accordingly, further deceleration takes point at point 152 to allow the first vehicle's speed to merge with that of the second vehicle, at a distance D1 from the second vehicle.

In any embodiment, including those described in relation to FIGS. 4 to 7, a coasting profile (or at least a portion thereof), may be rejected or modified if the instantaneous speed of the vehicle for which the coasting profile is generated exceeds or drops below a predetermined speed. The predetermined speed may be, for example, a maximum speed based on user preference, posted or legal speed limits, or speed restrictions based on, for example, weather conditions, road conditions, or terrain (e.g., it may be preferable to constrain speed during long and/or steep downhill sections). Similarly, a minimum speed may apply.

Although the embodiments of FIGS. 4 to 7 each shows only a single coasting profile, it will be appreciated that more than one profile may be generated for consideration. Each coasting profile that is generated may involve a different start time (or starting position on the path) and/or a different starting speed. For example, several coasting profiles may be generated, each starting at the same speed at a different point on the path. Alternatively, several coasting profiles may be generated, each starting at the same point on the path but at a different speed. Various combinations of these different starting times/path positions and speeds may be estimated.

Figure 8:
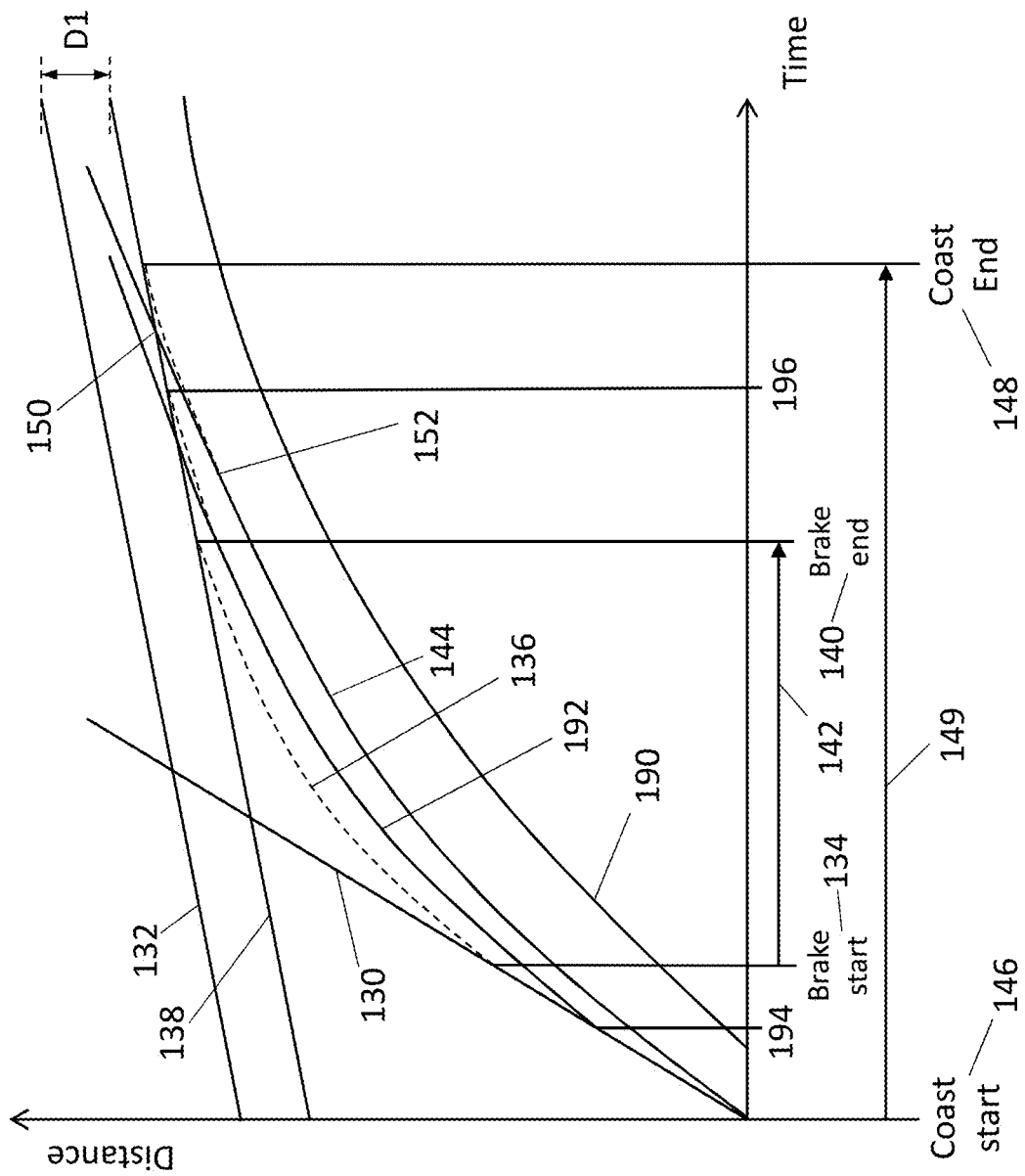
FIG. 8 is a graph showing distance relative to time for a method of controlling a prime mover of a first vehicle according to a further embodiment of the invention.

In FIG. 8, in which features corresponding to those shown in FIGS. 4 to 7 are indicated with like reference signs, there is shown an embodiment in which several different coasting profiles are generated. An earlier coasting profile 190 starts off the graph. Because it starts earlier, and the terrain in this example is flat, the car 100 slows down considerably before it reaches the line 138 representing the threshold distance D1. In fact, the car slows down so much according to the earlier coasting profile that it does not actually reach the line 138. A later coasting profile 192 starts at point 194, and joins line 138 at point 196. The later coasting event (the distance between points 194 and 196) is longer than the coasting event 149.

Any of these three coasting profiles 149, 190 and 192 may be selected for implementation, on any suitable basis. For example, while the earlier coasting profile 190 involves a long coasting time, it does not result in the car 100 reaching line 138. If it is desirable that the car 100 reach 138, then coasting profile 190 may not be selected, despite the longer coasting time it offers. The later coasting profile 192 does not result in the car 100 coasting for as long as coasting profile 149. On balance, coasting profile 149 may be selected from the three estimated coasting profiles for implementation.

As an alternative, upon noting that coasting profile 190 resulted in the car 100 not reaching line 138, it is possible to re-estimate with less braking (if any braking, such as regenerative braking, was originally modelled as part of the coasting profile) or with the addition of small amounts of torque, in order to ensure that line 138 is reached.

Where more than one coasting profile is estimated, one of them may be selected based on any suitable basis. For example, the coasting profile may be selected based on consideration of any one or more of the following characteristics:

Total coasting time/duration;
Total coasting distance;
Total estimated carbon emissions;
Total estimated fuel economy/energy consumption;
Average speed; (whether for the journey as a whole or a section of the journey involving some or all of the path over which coasting takes place)
Average journey time (whether for the journey as a whole or a section of the journey involving some or all of the path over which coasting takes place);
Comparison with passenger comfort metrics (e.g., passengers may not like to be exposed to large differences in highest and lowest speeds during a coasting event, so it may be desirable to choose another coasting profile with better metrics if available;
Coasting profile speed relative to that of second car (including any minimum distance). For example, it may be desirable if the vehicle's speed at the end of the coasting profile is similar to that of the second vehicle, as this minimises the amount of braking required.

These characteristics may be considered individually or hierarchically. For example, it may be most desirable to minimise fuel consumption (or energy consumption for an electrically powered vehicle), so that would be the first characteristic considered. If there were no clear winner (or if the differences between higher-ranking coasting profiles is within some threshold), the next most desirable characteristic may be maximum average speed. By working through a hierarchy of such characteristics, a most desirable coasting profile may be selected.

In other embodiments, a weighted average of the different characteristics may be determined, and the coasting profile selected based on the best result. For example, total fuel consumption may be weighted 1, and maximum average speed may be weighted 3. The calculated (and optionally normalised) value for fuel consumption is multiplied by its weighting of 3, while the calculated (and optionally normalised) value for maximum average speed is multiplied by its weighting of 1. The sum of all weighted values for the different coasting profiles are compared against each other, and the highest-rated is selected.

In one embodiment, the speed range when in a coasting mode may be wider than when in a non-coasting mode. For example, when in ordinary cruise control or driver assist mode, speed may be controlled to within +1 km/h and −2 km/h (or +1 mph and −2 mph, for example). For the purpose of generating profiles and implementing a selected coasting profile, a different, wider speed range may be employed. For example, in the coasting mode, the upper speed limit may be +3 km/h (or +2 mph, for example) and the lower speed limit may be −4 km/h (or 3 mph, for example), relative to a nominal speed.

It will be appreciated that generation of coasting profiles may be an ongoing or iterative process. For example, new coasting profiles may be generated, and/or existing coating profiles updated, on a periodic basis, such as every 5 seconds for example. Coasting profiles may be generated more often, and/or for a greater number of starting speeds, in certain circumstances, such as where an elevation profile of the upcoming path is complex. By recalculating existing coasting profiles using actual speeds attained during coasting, the models and data used for generating the coasting profiles may be improved for the car, both generally and/or for the particular stretches of road for which coasting profiles are generated. In this way more accurate coasting profiles will be generated, leading to potentially reduced fuel consumption and/or improved car user experience.

A potential effect of coasting is a change in journey time. While in certain circumstances journey time may in theory be reduced, it is more likely that increased coasting will result in increased journey times. As such, the vehicle may be equipped with the ability to selectively switch the coasting mode on, and/or to provide estimates of the impact on journey time that will result from using the coasting mode. In yet other embodiments, several coasting levels may be provided, allowing the driver to select the best compromise between increased coasting (lower fuel consumption) and decreased coasting (faster journey time). The levels may be based on, for example, different coasting speed ranges and/or coasting time/distance thresholds as described above.

Figure 9:
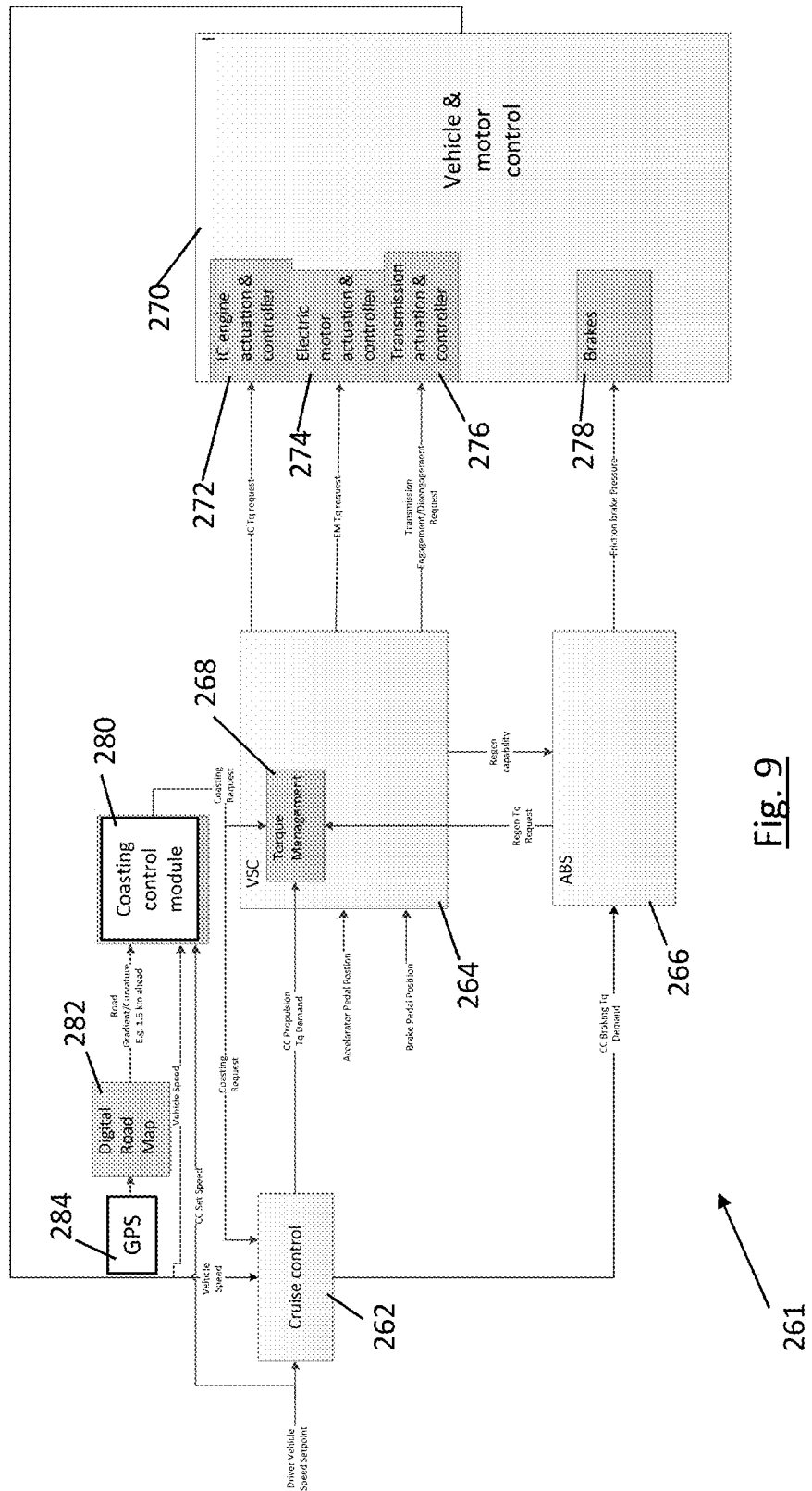
FIG. 9 is a schematic view of a cruise control architecture for implementing a method of controlling a prime mover of a first vehicle according to an embodiment of the invention.

Turning to FIG. 9, there is shown an example of a system comprising a vehicle speed control system 261 for maintaining a vehicle's speed within a speed range. The vehicle speed control system may take the form of a general purpose electronic processor programmed and configured to implement any of the methods described above. The apparatus may perform related functions, such as cruise control and/or torque management, or may be entirely separate from the processor(s) that implement such functions. Each of the modules described below may take the form of an individual piece of hardware, or may comprise software that runs on one or more processors.

The vehicle speed control system 261 comprises cruise control module 262 that accepts as inputs a speed setpoint from the driver, the current vehicle speed and a coasting request. The speed setpoint may be input by the driver in any suitable manner known to those skilled in the art, such by manually indicating by way of an input such as a stalk or button when a desired speed is reached, or by inputting a specific desired speed via, for example, a keypad. The cruise control module 262 also accepts as an input the current vehicle speed and a coasting request, the sources of which are described below.

The cruise control module 262 outputs a cruise control propulsion demand to a vehicle supervisory controller (VSC) module 264 and a cruise control braking demand to the ABS braking module 266.

The cruise control propulsion demand is routed to a torque management module 268 within the VSC module 264. The torque management module 268 also accepts as inputs the same coasting request as was received by the cruise control module 262 and a regenerative braking request from the ABS braking module 266.

The VSC module 264 also accepts as inputs an accelerator pedal position and a brake pedal position.

The VSC module 264 outputs an internal combustion (IC) request, an electric motor (EM) request and a transmission engagement/disengagement request. These three requests are supplied to a vehicle and motor control module 270. The IC request is routed to an IC engine actuation and controller module 272, the EM request is routed to an electric motor actuation and controller module 274, and the transmission engagement/disengagement request is routed to a transmission and actuation controller 276.

The ABS braking module 266 accepts as an input a regenerative braking capability signal from the VSC 264. The ABS braking module 266 also outputs a friction brake pressure signal that is supplied to the vehicle and motor control module 270 and routed to brakes 278 of the car.

The vehicle and motor control module 270 outputs the current vehicle speed that was earlier described as being supplied to the cruise control module 262. The current vehicle speed is also supplied to the means for generating a coasting profile in the form of a coasting control module 180. The coasting control module 280 also receives as inputs, road geometry, such as gradient and curvature data, from a digital road map 282 and the cruise control set speed. The coasting control module 180 outputs a coasting request to the cruise control module 262 and the torque management module 268, optionally the coasting control module 280 outputs a modified target speed.

The digital road map 282 receives current car position information from a GPS unit 284.

In this particular embodiment, all of the modules except the digital road map module 282 and the coasting control module 280 are conventional other than in relation to signalling inputs and outputs required by the addition of the coasting control module 280 and digital road map 282.

In use, the cruise control module 262 operates to maintain the speed of the vehicle within +1 km/h and −2 km/h of a set speed input by the user when not coasting. In parallel, the coasting control module 280 uses the current speed, the set speed and the digital road map 282 to generate a plurality of coasting profiles, as described above. When a suitable coasting profile is identified and selected for implementation by the coasting control module 280, it outputs a coasting signal to the cruise control module 262 and the torque management module 268 to enter the coasting mode.

In the embodiment illustrated, the instruction is sent at the point on the current path of the vehicle corresponding with the starting point of the selected coasting profile. Alternatively, the instruction may be sent earlier to account for delays or latency involved in initializing the coasting mode. For example, it may take a small number of seconds to shut down the IC motor, in which case the instruction to enter the coasting mode may be sent that number of seconds before the vehicle is expected to arrive at the point on the current path of the vehicle corresponding with the starting point of the selected coasting profile.

Upon receipt of the instruction to enter the coasting mode, the cruise control module 262 adopts a wider speed range, such as +2 km/h and −4 km/h, thereby allowing greater increases and decreases in speed before it intervenes. The torque management module 268 may instruct the transmission controller module 276 to place the car's transmission into neutral, and/or disengage a clutch to disconnect drive from the IC engine. Alternatively or in addition, the IC engine may be turned off via the IC engine actuation and controller module 272. Any or all of the modules within the vehicle and road module may be controlled to cause the car to coast, in accordance with the definition of coasting given above.

Once the coasting control module 280 determines that the car has reached the end of the selected coasting profile, the coasting request is cancelled. The cruise control adopts the narrower, non-coasting speed range. The torque management module 268 and/or ABS braking module 266 control their respective modules within the vehicle and motor control module 270 as required. This may involve restarting the IC engine, selecting a transmission gear, reengaging the clutch, and/or controlling the IC engine, electric motor, transmission and brakes in accordance with the requirements of the non-coasting mode.

As was the case when sending the instruction to enter the coasting mode, an instruction to exit the coasting mode may be issued at the point on the current path of the vehicle corresponding with the end point of the selected coasting profile. Alternatively, the instruction to exit may be sent earlier to account for delays involved in exiting the coasting mode. For example, it may take a small number of seconds to start the IC motor, in which case the instruction to exit the coasting mode may be sent that number of seconds before the vehicle is expected to arrive at the point on the current path of the vehicle corresponding with the end point of the selected coasting profile. Sending the instruction early also ensure that the vehicle has time to take any other steps necessary to ensure consistent driveability and safety.

The coasting mode may also be terminated if the predicted path changes (e.g., the vehicle unexpectedly changes route), the current speed deviates too far from that indicated by the coasting profile, or if the current speed exceeds or falls below the coasting mode speed range.

The previous embodiments have described controlling a prime mover of the vehicle to place the vehicle into a coasting mode in accordance with the at least one identified coasting profile. In other embodiments, instead of placing the vehicle into a coasting mode, feedback may be provided to a vehicle user (such as a driver) to place the vehicle into the coasting mode. Such feedback may make any suitable form, such as:

Audible: a sound or synthesised voice is used to provide the feedback;
Visual: one or more of text, images and/or icons may be displayed to the driver by way of an instrument cluster, a heads-up display, a screen, one or more lights, or any other visual indicator; and
Tactile: vibration or other tactile feedback may be provided via one or more actuators in, for example, the steering wheel, seat or foot pedals.

These feedback options are provided as examples only. The skilled person will appreciate that any other form of feedback may be used to tell the driver to place the vehicle into a coasting mode.

The user may, in response to the feedback, take steps to put the vehicle into the coasting mode. For example, in a manual car, the user may depress the clutch, and/or place the vehicle transmission into neutral. Alternatively, an input such as a touch-screen or dedicated button may be used by the user to indicate to the vehicle should enter the coasting mode.

The feedback may be provided immediately before the user should indicate whether to enter the coasting mode. Alternatively, the user may be given more notice. In some cases, this may enable to the user to indicate well in advance that the coasting mode should be entered (e.g., where the vehicle is taking responsibility for placing itself in the coasting mode). In other cases, it gives the user ample time to get ready to place the vehicle into the coasting mode. The feedback may be split into a preliminary indication, to prepare the user, and a secondary indication to let the user know that the vehicle should be placed into the coasting mode.

In all cases, the vehicle may optionally be placed into one of two or more modes, such as, for example:
coasting is entered automatically;
confirmation from the driver is awaited for each coasting event; or
the vehicle should not enter (or provide feedback about) entering the coasting mode.

In other embodiments, an user other than the driver may receive and/or act upon the coasting mode feedback. This may have particular application in, for example, autonomous or semi-autonomous vehicles.

While the various embodiments have described car-based methods and apparatus, the skilled person will understand that the methods and apparatus may be employed to maintain any suitable vehicle's speed within a range. For example, other embodiments may include vans, busses, trucks, and motorbikes.

Although the invention has been described reference to a number of specific non-exhaustive and non-limiting embodiments, the skilled person will appreciate that the invention may be embodied in many other forms.

The invention claimed is:

1. A method of assisting in the control of a prime mover of a first vehicle following a first path, comprising:
estimating a likely speed behavior of a second vehicle ahead of the first vehicle based on a predicted path of the second vehicle;
estimating at least one estimated coasting profile for the first vehicle over at least part of the first path and/or the predicted path, the at least one estimated coasting profile representing a predicted speed profile of the first vehicle while the first vehicle is coasting, the predicted speed profile of the first vehicle being over a time and/or distance from a starting point of the at least one estimated coasting profile;
determining that at least one coasting profile from the at least one estimated coasting profile meets a predetermined coasting requirement that comprises at least one of a minimum coasting mode duration or a minimum coasting mode distance, while maintaining a minimum distance between the first and second vehicles; and
outputting a coasting signal for either:
controlling the prime mover to place the first vehicle into a coasting mode based on the at least one coasting profile that meets the predetermined coasting requirement; or
providing feedback to a vehicle user to place the first vehicle into a coasting mode, such that the first vehicle if placed in the coasting mode by the user will coast in accordance with the at least one coasting profile that meets the predetermined coasting requirement.

2. The method of claim 1, wherein the predetermined coasting requirement comprises one or more of:
a speed of the first vehicle being within a predetermined tolerance of a speed of the second vehicle; and
the speed of the first vehicle being within a predetermined tolerance of the speed of the second vehicle while maintaining the minimum and/or a maximum distance between the first and second vehicles.

3. The method of claim 1, wherein controlling the prime mover comprises one or more of:
placing a transmission associated with the prime mover into neutral;

disengaging a clutch associated with the prime mover;
turning off the prime mover; and
modulating one or more engine air system actuators so as to reduce or minimize engine pumping losses, wherein the one or more engine air system actuators comprise one or more of an exhaust gas recirculation valve, a variable geometry turbocharger, an intake throttle, and a continuous variable valve timing.

4. The method of claim 1, wherein the first vehicle includes a regenerative prime mover, and the coasting mode includes regenerative braking.

5. The method of claim 1, wherein determining that the at least one coasting profile meets the minimum distance between the first and second vehicles of the predetermined coasting requirement is based on the predicted speed profile of the first vehicle and the estimated likely speed behavior of the second vehicle.

6. The method of claim 1, wherein
the at least one estimated coasting profile includes an indication of a total distance the first vehicle will travel in the coasting mode and an indication of a total time that the first vehicle will travel in the coasting mode; and
determining that the at least one coasting profile meets the predetermined coasting requirement includes comparing the total time the minimum coasting mode duration and/or the total distance to the minimum coasting mode distance.

7. A vehicle coasting system for assisting in the control of a prime mover of a first vehicle following a first path, the vehicle coasting system comprising:
means for estimating a likely speed behavior of a second vehicle ahead of the first vehicle based on a predicted path of the second vehicle;
means for estimating at least one estimated coasting profile for the first vehicle over at least part of the first path and/or the predicted path, the at least one estimated coasting profile representing a predicted speed profile of the first vehicle while the first vehicle is coasting, the predicted speed profile of the first vehicle being over a time and/or distance from a starting point of the at least one estimated coasting profile;
means for determining that at least one coasting profile from the estimated at least one estimated coasting profile meets a predetermined coasting requirement that comprises a minimum coasting mode duration or a minimum coasting mode distance, while maintaining a minimum distance between the first and second vehicles; and
means for outputting a coasting signal for either:
controlling the prime mover to place the first vehicle into a coasting mode based on the at least one coasting profile that meets the predetermined coasting requirement; or
provide feedback to a vehicle user to place the first vehicle into a coasting mode, such that the first vehicle if placed in the coasting mode by the user will coast in accordance with the at least one coasting profile that meets the predetermined coasting requirement.

8. The vehicle coasting system of claim 7, where the means for estimating a likely speed behavior of the second vehicle, comprises:
an electronic processor having an electrical input for receiving signals indicative of a value of vehicle speed, distance to the second vehicle ahead of the first vehicle, current location of the first vehicle and map data, and;
an electronic memory device electrically coupled to the electronic processor and having instructions stored therein, wherein
the electronic processor is configured to access the electronic memory device and execute the instructions stored therein such that the electronic processor is operable, in dependence on said signals indicative of the value of vehicle speed, distance to the second vehicle ahead of the first vehicle, current location of the first vehicle and map data, to determine the at least one coasting profile that meets the predetermined coasting requirement.

9. The vehicle coasting system of claim 8, wherein the means for determining at least one coasting profile and the means for outputting a coasting signal comprise the electronic processor identifying one of said estimate of a likely speed behavior of the second vehicle based on a predicted path of the second vehicle and generating said coasting signal in response thereto.

10. The vehicle coasting system of claim 7, including means, responsive to the coasting signal, for controlling the prime mover to place the first vehicle into the coasting mode based on the determined at least one coasting profile.

11. The vehicle coasting system of claim 7, including means, responsive to the coasting signal, for providing feedback to a vehicle user to place the first vehicle into the coasting mode, such that the first vehicle if placed in the coasting mode by the user will coast in accordance with the determined at least one coasting profile.

12. The vehicle coasting system of claim 7, wherein the predetermined coasting requirement comprises one or more of:
a speed of the first vehicle being within a predetermined tolerance of a speed of the second vehicle; and
the speed of the first vehicle being within a predetermined tolerance of the speed of the second vehicle while maintaining the minimum and/or a maximum distance between the first and second vehicles.

13. The vehicle coasting system of claim 7, wherein controlling the prime mover comprises one or more of:
placing a transmission associated with the prime mover into neutral;
disengaging a clutch associated with the prime mover;
turning off the prime mover; and
modulating one or more engine system actuators so as to reduce or minimize pumping losses, wherein the one or more engine system actuators comprise one or more of an exhaust gas recirculation valve, a variable geometry turbocharger, an intake throttle, and a continuous variable valve timing.

14. The vehicle coasting system of claim 7, wherein the first vehicle includes a regenerative prime mover, and the coasting mode includes regenerative braking.

15. The vehicle coasting system of claim 7, wherein the at least one coasting profile is determined to meet the minimum distance between the first and second vehicles of the predetermined coasting requirement based on the predicted speed profile of the first vehicle and the estimated likely speed behavior of the second vehicle.

16. The vehicle coasting system of claim 7, wherein
the at least one estimated coasting profile includes an indication of a total distance the first vehicle will travel in the coasting mode and an indication of a total time that the first vehicle will travel in the coasting mode; and
the at least one coasting profile is determined to meet the predetermined coasting requirement by comparing the total time the minimum coasting mode duration and/or the total distance to the minimum coasting mode distance.

17. A non-transitory storage medium comprising a plurality of processor-executable instructions to:
- estimate a likely speed behavior of a second vehicle ahead of a first vehicle based on a predicted path of the second vehicle;
- estimate at least one estimated coasting profile for the first vehicle over at least part of a first path that the first vehicle is following and/or the predicted path, the at least one estimated coasting profile representing a predicted speed profile of the first vehicle while the first vehicle is coasting, the predicted speed profile of the first vehicle being over a time and/or distance from a starting point of the at least one estimated coasting profile;
- determine that at least one coasting profile from the at least one estimated coasting profile meets a predetermined coasting requirement that comprises a minimum coasting mode duration or a minimum coasting mode distance, while maintaining a minimum distance between the first and second vehicles; and
- output a coasting signal for either:
  - controlling the prime mover to place the first vehicle into a coasting mode based on the at least one coasting profile that meets the predetermined coasting requirement; or
  - providing feedback to a vehicle user to place the first vehicle into a coasting mode, such that the first vehicle if placed in the coasting mode by the user will coast in accordance with the at least one coasting profile that meets the predetermined coasting requirement.

18. The non-transitory storage medium of claim 17, wherein the at least one coasting profile is determined to meet the minimum distance between the first and second vehicles of the predetermined coasting requirement based on the predicted speed profile of the first vehicle and the estimated likely speed behavior of the second vehicle.

19. The non-transitory storage medium of claim 17, wherein
- the at least one estimated coasting profile includes an indication of a total distance the first vehicle will travel in the coasting mode and an indication of a total time that the first vehicle will travel in the coasting mode; and
- the at least one coasting profile is determined to meet the predetermined coasting requirement by comparing the total time the minimum coasting mode duration and/or the total distance to the minimum coasting mode distance.

* * * * *